No. 893,483. PATENTED JULY 14, 1908.
W. GRAY.
HIGH PRESSURE STEAM AND WATER COOKER.
APPLICATION FILED MAR. 9, 1905.
2 SHEETS—SHEET 1.
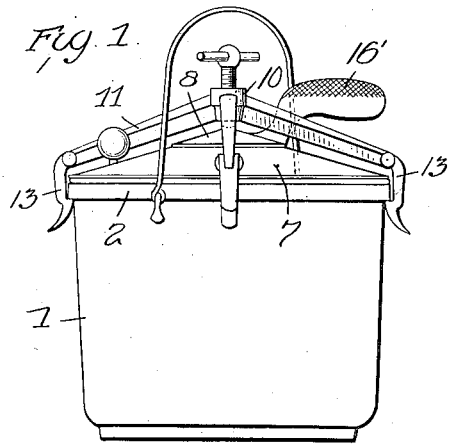
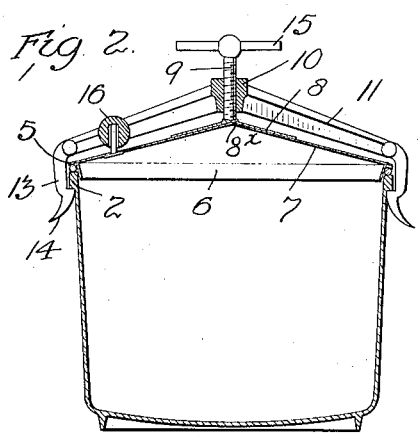
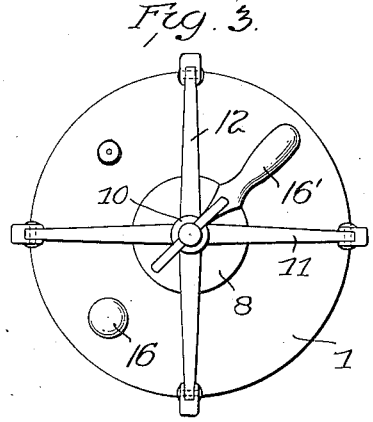
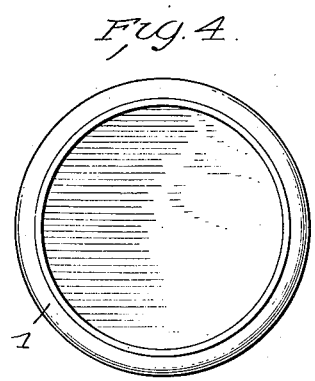
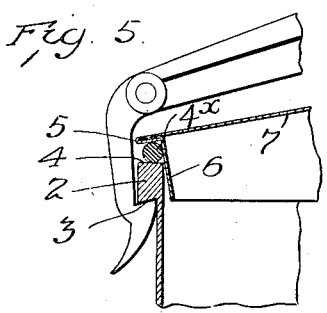
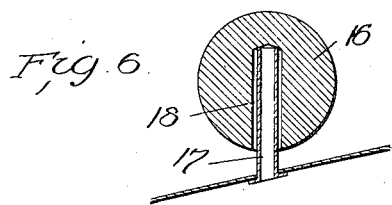
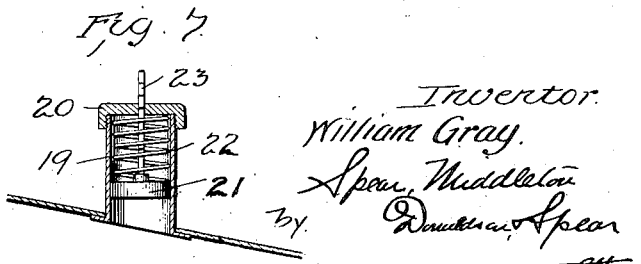

No. 893,483. PATENTED JULY 14, 1908.
W. GRAY.
HIGH PRESSURE STEAM AND WATER COOKER.
APPLICATION FILED MAR. 9, 1905.
2 SHEETS—SHEET 2.
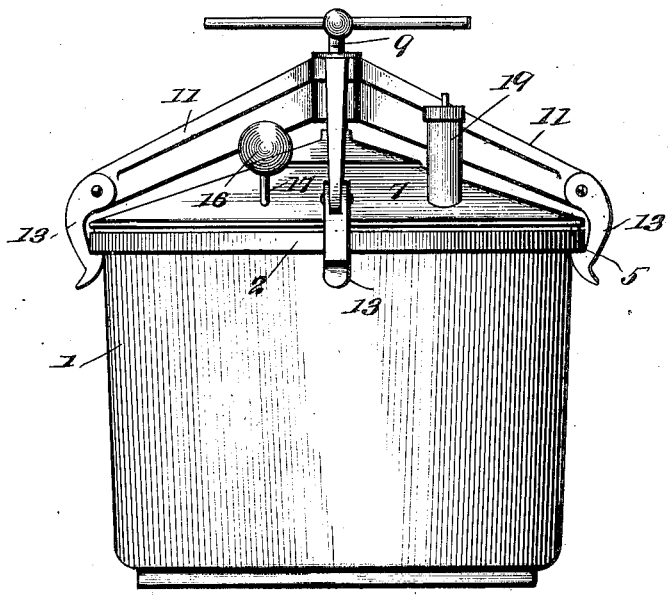
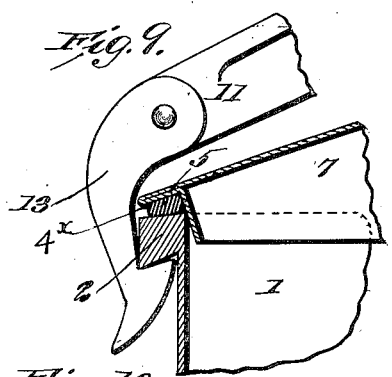
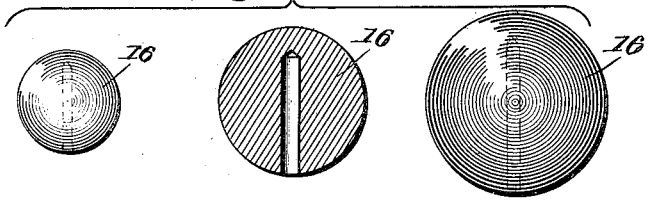
WITNESSES
E. M. Callaghan
Amos W. Hart
INVENTOR
WILLIAM GRAY
BY Munn & Co.
ATTORNEYS

UNITED STATES PATENT OFFICE.

WILLIAM GRAY, OF LINCOLN, NEBRASKA.

HIGH-PRESSURE STEAM AND WATER COOKER.

No. 893,483.

Specification of Letters Patent.

Patented July 14, 1908.

Application filed March 9, 1905. Serial No. 249,260.

*To all whom it may concern:*

Be it known that I, WILLIAM GRAY, a citizen of the United States, residing at Lincoln, Nebraska, have invented certain new and useful Improvements in High-Pressure Steam and Water Cookers, of which the following is a specification.

The object of my invention is to produce a simple, economical and effective vessel or kettle that by proper use will cook the quickest, perfectly done and never burn the food, or cook as slow as desired. In either case with the least possible heat and cook alike at all altitudes, retaining mostly all flavor in the food by quick cooking and in the liquid by slow cooking, in all events retaining all flavor in the kettle, leaving it largely in either the food or liquid as desired, and in so doing neither increase or condense by evaporation, the chemicals such as alkali, lime and other chemicals in the matter, nor dilute the liquid by condensation of steam or additions of water, all of which with other advantages gained and disadvantages avoided are desirable, which will be fully explained hereinafter.

In carrying out my invention I aim to provide such a form of apparatus as will enable the cooking operation to be carried on without adding to the amount of water first placed in the vessel with the food and without decreasing the amount of said liquid by reason of excessive evaporation, the relative proportion of the liquid to the solid matter remaining approximately the same throughout the cooking operation and no more being present in the vessel at the termination of said operation than at commencement.

In many localities for instance, where the water is charged with alkali, lime or other minerals, the ordinary process of cooking in which water is evaporated from and added to the vessel at different times while the cooking proceeds, to make up for evaporation losses, the resulting product contains a much higher percentage of the alkali, lime or other minerals than in the natural water and thus deleteriously affects the persons eating the food, and especially the liquids cooked in such manner. With my invention, however, the amount of liquid used at the beginning of the operation is not altered in volume, neither being increased or diminished, and in this way a definite and predetermined result will be accomplished, no diluting of the cooking substance taking place and no concentration of the mineral matter in the water.

The invention is intended for use as a high pressure combined water and steam cooker in which the food, water and steam occupy any or all parts of the vessel as may be desired.

While I have illustrated my invention in the form of a household utensil, it will be understood that its form and size may be changed for use on a larger scale and indeed the general and underlying principles and features of my invention may be employed in apparatus intended for purposes other than cooking.

The invention consists in the features and combination and arrangement of parts hereinafter described and particularly pointed out in the claims.

In the accompanying drawings:—Figure 1 is a side elevation of the invention as embodied in a cooking kettle adapted for household use, Fig. 2 is a central vertical cross sectional view of the invention, Fig. 3 is a plan view of the vessel embodying my invention, Fig. 4 is a bottom plan view of the vessel, Fig. 5 is a detail view partly in section and partly in elevation showing the relation of the cover to the vessel and the means for holding the cover in place thereon, Fig. 6 is a sectional view in detail of the ball safety valve in its relation to the cover of the vessel, and Fig. 7 is a sectional view of the steam pressure indicator in its relation to the cover of the vessel. Fig. 8 is a side view of the cooking kettle, particularly illustrating the arrangement of the safety attachment and the steam pressure indicator on the cover. Fig. 9 is a sectional view illustrating the compression of the packing ring when the cover is screwed down. Fig. 10 is a view illustrating a series of ball valves graduated in size and weight.

The main body of the vessel may be of any suitable form such as shown at 1 in Fig. 1 and is constructed of sheet or cast material, though other materials may be used. I do not limit myself either in this respect or in respect to the size or shape of the said vessel.

At its upper edge the vessel is provided with a rim 2 projecting outwardly and slightly beveled on its under side as at 3, the said bevel providing a surface inclining inwardly and upwardly in respect to the central line of the vessel. While this rim adds much necessary strength to the top of the kettle it also provides a wide bearing surface at the top of the vessel as at 4, upon which rests a packing ring $4^\times$ composed of rubber, fiber or any suitable material. Upon this packing ring the cover of the vessel rests, for which purpose the said cover terminates as a flange 5 extending outwardly and overlying the packing ring, the latter having the same downward inclination as the top of the cover so that when the cover fastening is tightened the packing ring is compressed and wedged in the space beneath the flange 5, as shown in Fig. 9. The cover also has a downwardly projecting flange 6 against the outside of which the packing ring rests so that the said ring is located in a corner formed by the two flanges 5 and 6 of the cover.

The cover indicated at 7 may be of either cast or sheet metal, and if of the latter, I prefer to make it of complete conical form as shown in order to secure the greatest strength. When made of sheet metal I provide a reinforcing or pressure distributing plate indicated at 8, the said plate having a handle 16' and being of conical form to fit the apex of the conical shaped cover, and upon this pressure distributer the pressure screw 9 bears with its lower end, and I prefer to slightly thicken the center of the pressure distributer plate and form the same with a slight conical depression $8^\times$ at the thickened central portion to receive the lower conical end of the said pressure screw. This pressure screw passes through a screw threaded boss or hub 10 of a spider or clamping frame 11, which is made of malleable cast iron or drop forged steel. The outer ends of said arms forming the spider to extend slightly over the rim of the kettle and to have malleable cast iron or drop forged steel hooks 13 securely riveted or bolted to swing free from said arms at a point directly over or nearly over the rim of the kettle which will automatically swing out and back and thus catch on the beveled under side of the rim of the kettle by merely being placed thereon. Thus by the pressure of said screw 9 the lid and packing ring are firmly held on the rim of the kettle without drawing in the sides thereof. The extreme lower ends of the hooks are curved outwardly as at 14 so that in placing the cover in position together with the clamping frame the inclined edges of the hooks will ride on the edge of the rim of the vessel and as above stated the hooks will automatically engage therewith.

The cover of the vessel is provided with a ball safety attachment 16 of novel form and arrangement. The safety attachment 16 is a metal ball cast or forged and drilled out from the bottom up to far above the center forming the valve seat inside near the top of the ball which seat may be flat or conical where it rests on the escape pipe. In this way gravity automatically adjusts and holds the ball or valve to rest upon and perfectly fit the top end of escape pipe, the hole being sufficiently larger than the escape to form a downward escape for the steam around the pipe and prevent opportunity of being burned thereby. The cover is also provided with a steam pressure indicator comprising a cylinder 19 attached to the cover and provided with a screw threaded top 20 thereon, the said cylinder having within it a piston 21 exposed on its under side to the steam pressure within the vessel, and subjected on its upper side to a spring 22, the said piston having a stem 23 passing through the cover 20, which stem is graduated and serves as a pressure indicator by the said graduations appearing above the surface of the cover.

Different weights of ball safety attachments are employed to suit the different steam pressures desired within the vessel, required by the kind of cooking to be done, and when the pressure within the vessel exceeds that for which the weight of the ball is adapted, the said ball will be lifted immediately from the pipe 17 and the excess steam will pass out through the recess or bore of the said ball discharging itself downwardly and thus rendering accidents to the operator less liable to occur. The ball is large enough and the recess therein is of sufficient length to prevent the ball from lifting entirely off the pipe and being displaced therefrom. When the steam pressure lowers within the vessel the ball automatically seats itself by gravity upon the end of the escape pipe the graduations on the stem of the pressure-indicator 23 have a certain relation to the diameter or weight of the ball. Thus when the pressure within the kettle is sufficient to raise the pressure indicator so that a mark or graduation appears above the cover 20, this would indicate a pressure equivalent to the weight of the smallest ball valve, and when the stem rises far enough to show the second mark or graduation, it would indicate a pressure equivalent to the next size of ball valve, and so on.

From the above it will be seen that I provide a kettle or cooking vessel which is perfectly steam tight to any desired steam pressure and having a readily adjustable and detachable cover so that the kettle may be used as an ordinary cooking vessel in the usual way, or as a perfectly steam tight high pressure combined water and steam cooker.

By placing the food to be cooked in the vessel and supplying the predetermined quantity of water to submerge the same, and then subjecting the vessel to heat, the steam pressure will be produced within the vessel above the water and this will cause the cooking operation to be performed much quicker and more evenly and better than by the use merely of steam at low pressure or at high pressure with the food exposed above the water and much quicker and more evenly and with a much less consumption of fuel than by cooking in the ordinary way.

In the use of the vessel or combined steam and water cooker the food is placed within the vessel with the quantity of water predetermined upon by experience as sufficient to best carry out the operation, the kettle is then closed by putting on the cover and the spider so that the hooks will engage below the rim of the vessel. The screw is then turned to clamp the cover securely in place with the packing interposed between it and the vessel and the ball safety attachment of the desired weight is placed on the escape pipe and then the kettle is subjected to a proper amount of heat. By using a heavy ball to maintain a high pressure within the vessel the cooking will be quickly performed leaving the juices and flavor largely within the food or with a light valve or ball and lower pressure the cooking operation will be carried out more slowly and more of the juices and flavor will be extracted from the food substances and will be retained in the liquid, but in any case all of the essence and flavor of the food will be retained in the vessel and be utilized.

At the termination of the cooking operation the ball may be removed, allowing the steam to escape slightly and the clamping screw is then slowly loosened to slightly loosen the cover, thus allowing the steam to escape slowly without danger and before the hooks can be removed or disengaged from the rim of the vessel.

While I have shown the cooking vessel as having only one compartment, I do not wish to limit myself in this respect as means may be provided therein whereby the food to be cooked may be held separate from the water in the vessel.

It will be seen from the above that I provide a vessel capable of being closed entirely steam tight at any desired degree of pressure and it is important to note in this connection that both the safety ball valve and the steam pressure gage coöperate to this end. For instance, if a ball is placed on the escape pipe sufficient to hold a pressure of say 20 pounds within the vessel and this vessel is placed on the front of the stove, the pressure may rise above that determined upon and the safety valve will therefore open and some excess steam escape. The cook will then change the vessel to a different part of the stove where the safety attachment will remain closed and pressure retained and no steam will be lost and then by observing the pressure gage the cook may know whether the pressure is being maintained at the desired degree or has fallen below the same, whereupon she may set the vessel where it will be subjected to proper heat, from all of which it will be seen that both the safety valve and the pressure gage are necessary and contribute to the object sought. In this way the cooking may be carried on quickly and evenly and without the loss of any of the steam which results in carrying off a part of the aroma and essence of the food.

I claim:—

1. The combination, with the body of a kettle having a projecting rim beveled on the under side from its outer lower edge upward and inward to the body and extending completely around the kettle, and a cover, of a spider frame having a central hub and arms extending outwardly therefrom, a screw passing through said hub and adapted to bear upon the center of the cover, and hooks pivoted to and suspended from the extremities of the arms at a point over the rim of the kettle, whereby they are adapted to automatically engage the under side of the rim when the screw is tightened, substantially as described.

2. The combination, with the cover and body of a kettle having an exterior projection which is beveled on the under side upward and inward, of a fastening for said cover which comprises a screw, a central hub adapted to receive the screw, a series of arms projecting therefrom, and a series of hooks pivoted to and suspended from the extremities of the arms whereby they are adapted to automatically engage said projection, substantially as described.

3. The combination, with the cover and body of a kettle having an exterior projection which is undercut, of a cover-fastening comprising a screw and a hub having a series of diverging arms extending over the cover and hooks pivoted thereto and adapted to enter the undercut of the aforesaid projection, substantially as described.

4. The improved cooking kettle comprising the body having a beveled rim, a cover having a safety attachment comprising an open-end tube, and a weighted valve having a bore that receives said tube and provides a seat normally closing the mouth of the tube, a pressure indicator arranged on the cover, and the fastening for the latter comprising a spider having diverging arms and hooks pivoted thereto at points over the rim and adapted to engage the latter automatically by the action of gravity as shown and described.

5. The improved spider for the kettle cover comprising a screw, the central hub, arms formed integrally therewith and diverging therefrom, and a series of hooks pivoted to and swinging free from the extremities of the several arms, as shown and described.

6. In a steam-tight kettle, the cover provided with a vertical tube, a gravity-balanced valve having a radial bore extending above the center of gravity of the valve and made of greater diameter than the tube in order to receive the same loosely, the upper end of the bore being in direct contact with the tube and thus constituting the valve seat as shown and described.

7. The combination with the kettle body having a flat top rim, the conical cover having a flange projecting over said top at a downward inclination thereto, the body or inner flange of said cover abutting the inner angle of the rim, whereby a space is formed between the rim and the two cover flanges which narrows from the inside outward, and an annular packing of elastic material arranged in such space, whereby it is wedged therein when pressed outwardly by steam as shown and described.

8. The combination with a cooking kettle provided with a practically steam-tight cover and an open-end tube, of a gravity balanced and seated pressure regulator consisting of a ball having a hole extending more than half through it, and terminating with a conical seat whereby the valve is adapted to seat and automatically balance on said tube, as shown and described.

9. The improved kettle cover having a conical shape utilized for the purpose of strength, the pressure-distributer having a corresponding shape and fitted on the apex of the cover proper and provided with a lateral integral handle, as shown and described.

10. The improved kettle having a cover provided with the vent attachment comprising the vertical open-end tube and a series of ball valves of different diameters, each having a bore which extends more than half way through it and receives the tube loosely, and the pressure-indicator arranged on the cover and having a piston stem graduated to indicate degrees of steam pressure for which the different valves are proportioned in size and weight, as described, and the means for fastening the cover as shown and described.

In testimony whereof, I affix my signature in presence of two witnesses.

WILLIAM GRAY.

Witnesses:
　EDWARD SARTOU,
　CHAS. W. STEERS.